United States Patent
Ide et al.

(10) Patent No.: US 11,004,275 B2
(45) Date of Patent: May 11, 2021

(54) PRODUCT EVALUATION RESULT DISPLAY SYSTEM

(71) Applicant: Honda Motor Co., Ltd., Tokyo (JP)

(72) Inventors: Hayato Ide, Tochigi (JP); Takaya Yamazaki, Tochigi (JP); Hiroshi Ogawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/718,147

(22) Filed: Dec. 17, 2019

(65) Prior Publication Data
US 2020/0226846 A1    Jul. 16, 2020

(30) Foreign Application Priority Data
Jan. 10, 2019 (JP) ............... JP2019-003002

(51) Int. Cl.
*G06T 19/20* (2011.01)
(52) U.S. Cl.
CPC ...... *G06T 19/20* (2013.01); *G06T 2219/2016* (2013.01)
(58) Field of Classification Search
CPC ............ G06T 19/20; G06T 2219/004
See application file for complete search history.

(56) References Cited

U.S. PATENT DOCUMENTS

2017/0148227 A1* 5/2017 Alsaffar ............... G06T 11/60

FOREIGN PATENT DOCUMENTS

| JP | 4600113 | 12/2010 |
|---|---|---|
| JP | 2017215797 | 12/2017 |

* cited by examiner

*Primary Examiner* — Thomas J Lett
(74) *Attorney, Agent, or Firm* — JCIPRNET

(57) ABSTRACT

Provided is a product evaluation result display system. At least a part of a product image representing a three-dimensional shape of a product that is configured by assembly of a plurality of parts is output to an output interface. When an evaluation point of the product is designated by a user through the input interface, in association with a designated part having a relatively high contribution degree with respect to the position precision of the evaluation point on the basis of a reference shape of the product, a contribution degree index image representing the contribution degree is output to the output interface. Therefore, within the plurality of parts constituting the product, the designated part having a relatively high contribution degree with respect to the position precision of the evaluation point designated by the user can be easily recognized by the user.

12 Claims, 5 Drawing Sheets

PRODUCT EVALUATION RESULT DISPLAY SYSTEM

CROSS-REFERENCE TO RELATED APPLICATION

This application claims the priority of Japan patent application serial no. 2019-003002, filed on Jan. 10, 2019. The entirety of the above-mentioned patent application is hereby incorporated by reference herein and made a part of this specification.

BACKGROUND OF THE DISCLOSURE

Technical Field

The disclosure relates to a system for displaying a product evaluation result.

Related Art

A technical method for managing, during manufacturing of a vehicle body manufactured by assembling a plurality of vehicle components that is configured by assembly of a plurality of parts, the assembly precision of the plurality of parts and the vehicle components is proposed (for example, see patent literature 1). Specifically, assembly position data serving as measurement data of assembly positions of the parts and the vehicle components is used as an illustrative variable, reference assembly position data representing the assembly precision of a finished product of the vehicle body is used as an objective variable, and a part or a vehicle component having a relatively high contribution rate with respect to the assembly precision of the finished product is specified by a regression analysis.

A technical method is proposed which collectively or individually selects a plurality of elements constituting an element group included in a selection range of a three-dimensional image of an assembly corresponding to the number of the plurality of elements (for example, see patent literature 2).

[Patent literature 1] Japanese Patent No. 4600113
[Patent literature 2] Japanese Patent Laid-Open No. 2017-215797

However, it is difficult to grasp the level of a contribution rate of the assembly position precision of parts constituting a product with respect to the assembly precision of the product.

SUMMARY

The product evaluation result display system in an embodiment of the disclosure includes an input interface, an output interface, and an image control device, the image control device displaying, on the output interface, a product image representing a three-dimensional shape of a product that is configured by assembly of a plurality of parts; selecting, when an evaluation point of the product is designated through the input interface, a designated part within the plurality of parts which has a relatively high contribution degree with respect to a position precision of the evaluation point on a basis of a reference shape of the product; and displaying a contribution degree index image representing the contribution degree on the output interface in association with the designated part.

In the product evaluation result display system according to an embodiment of the disclosure, the image control device selects a designated site having a relatively high contribution degree with respect to the position precision of the evaluation point on the basis of the reference shape in the designated part, and displays the contribution degree index image on the output interface in association with the designated site.

In the product evaluation result display system according to an embodiment of the disclosure, the image control device displays the contribution degree index image on the output interface in different forms corresponding to a level of the contribution degree.

In the product evaluation result display system according to an embodiment of the disclosure, the image control device displays the contribution degree index image on the output interface so as to display the contribution degree index image on a surface of the product image.

DESCRIPTION OF THE EMBODIMENTS

The disclosure provides a system with which it is possible to easily grasp the level of a contribution rate of the assembly position precision of parts constituting a product such as a vehicle or the like with respect to the assembly precision of the product.

According to the product evaluation result display system having this configuration, the product image (product in a virtual space where a three-dimensional image is expressed) representing the three-dimensional shape of the product that is configured by assembly of a plurality of parts is output to the output interface. When the evaluation point of the product is designated by a user through the input interface, in association with the designated part having a relatively high contribution degree with respect to the position precision of the evaluation point on the basis of a reference shape of the product, the contribution degree index image representing the contribution degree is output to the output interface. Therefore, within the plurality of parts constituting the product, the designated part having a relatively high contribution degree with respect to the position precision of the evaluation point designated by the user can be easily recognized by the user.

According to the product evaluation result display system having this configuration, in the designated part having a relatively high contribution degree with respect to the position precision of the evaluation point within the plurality of parts constituting the product, the site having a relatively high contribution degree can be easily recognized by the user as a designated site.

According to the product evaluation result display system having this configuration, in each of a plurality of designated parts having a relatively high contribution degree or influence rate with respect to the position precision of the evaluation point within the plurality of parts constituting the product, the level of the contribution degree can be easily recognized by the user.

According to the product evaluation result display system having this configuration, within the plurality of parts constituting the product, the designated part or the site thereof having a relatively high contribution degree that is calculated according to a regression analysis with respect to the position precision of the evaluation point designated by the user can be confirmed on a three-dimensional image displayed on a screen, and thus can be easily and intuitively recognized by the user.

(Configuration)

Figure 1:
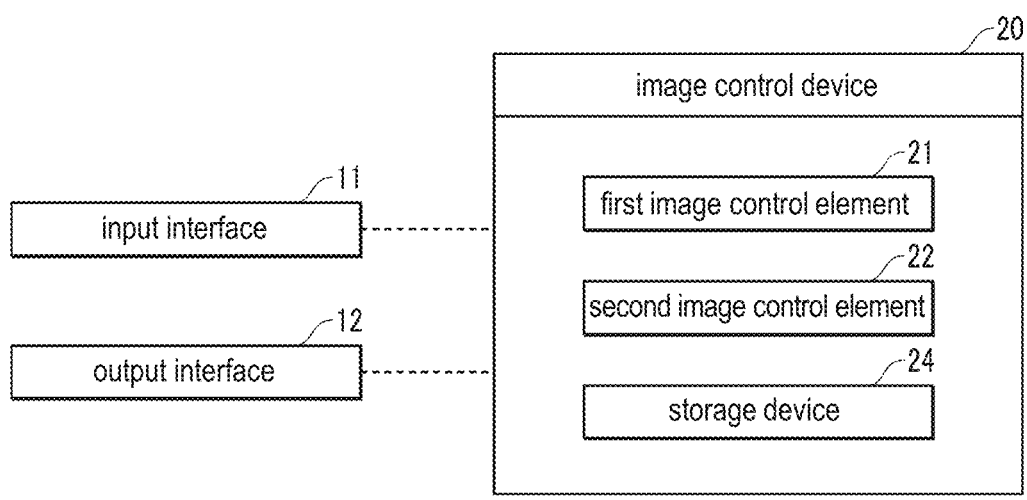
FIG. 1 is an illustrative configuration diagram of a product evaluation result display system used as an embodiment of the disclosure.

A product evaluation result display system used as an embodiment of the disclosure shown in FIG. 1 includes an input interface 11, an output interface 12, and an image control device 20.

The input interface 11 further includes a keyboard, a touch panel, a mouse pointing device or a voice input device, or a command input device consisting of any combination thereof. The input interface 11 acquires product shape measurement data representing a measurement result of a real space shape (three-dimensional shape) of the product. For example, the input interface 11 may be optically connected to a device that optically measures real space positions of a plurality of real space designated points of the product, and may include this device. The output interface 12 may be configured by a display device.

The image control device 20 includes a first image control element 21 and a second image control element 22. Each of the image control elements 21 and 22 is configured by a storage device 24 such as a memory or the like, and an operation processing device (CPU, single processor core, multiprocessor core or the like) that reads out data from the storage device 24, generates image data by executing operation processing on the data, and displays an image based on the image data on the output interface 12.

The first image control element 21 displays a product image representing the three-dimensional shape of the product on the output interface 12. The first image control element 21 changes a posture, scale, display range and the like of a product image P0 in a three-dimensional virtual space according to a command passing through the input interface 11. That is, through the input interface 11, a position of a viewpoint facing the product image P0 can be changed, and then the product image P0 can be rotated and the scale can be changed in the three-dimensional virtual space.

The second image control element 22 evaluates, for each of a plurality of parts constituting the product, the contribution degree to the position precision on the basis of a reference shape of the product (for example, the three-dimensional shape in product design) at the evaluation point of the product designated through the input interface 11. The second image control element 22 selects, within the plurality of parts constituting the product, some parts that are relatively high in evaluated contribution degree as designated parts, and outputs a contribution degree index image representing the contribution degree to the output interface 12 in association with the designated parts. The second image control element 22 changes a display form of the contribution degree index image corresponding to the change in posture, scale, display range and the like of the product image P0 in the three-dimensional virtual space according to the command through the input interface 11.

(Function)

According to the product evaluation result display system used as an embodiment of the disclosure, in addition to reference shape data representing a three-dimensional reference shape of an upper body of a vehicle (corresponding to "product" in the embodiment) that is manufactured by assembly of a plurality of parts such as a roof panel, a central pillar, a front inside seal, a front side frame and the like, product shape measurement data representing a measurement result of a three-dimensional real space shape (real space position at one site or a plurality of sites of each of the plurality of parts) thereof is stored in the storage device 24 constituting the image control device 20. In addition to an intermediate finished product or completely finished product associated to the vehicle, the "product" may be any product other than the vehicle, such as a home electrical appliance or the like.

Figure 2:
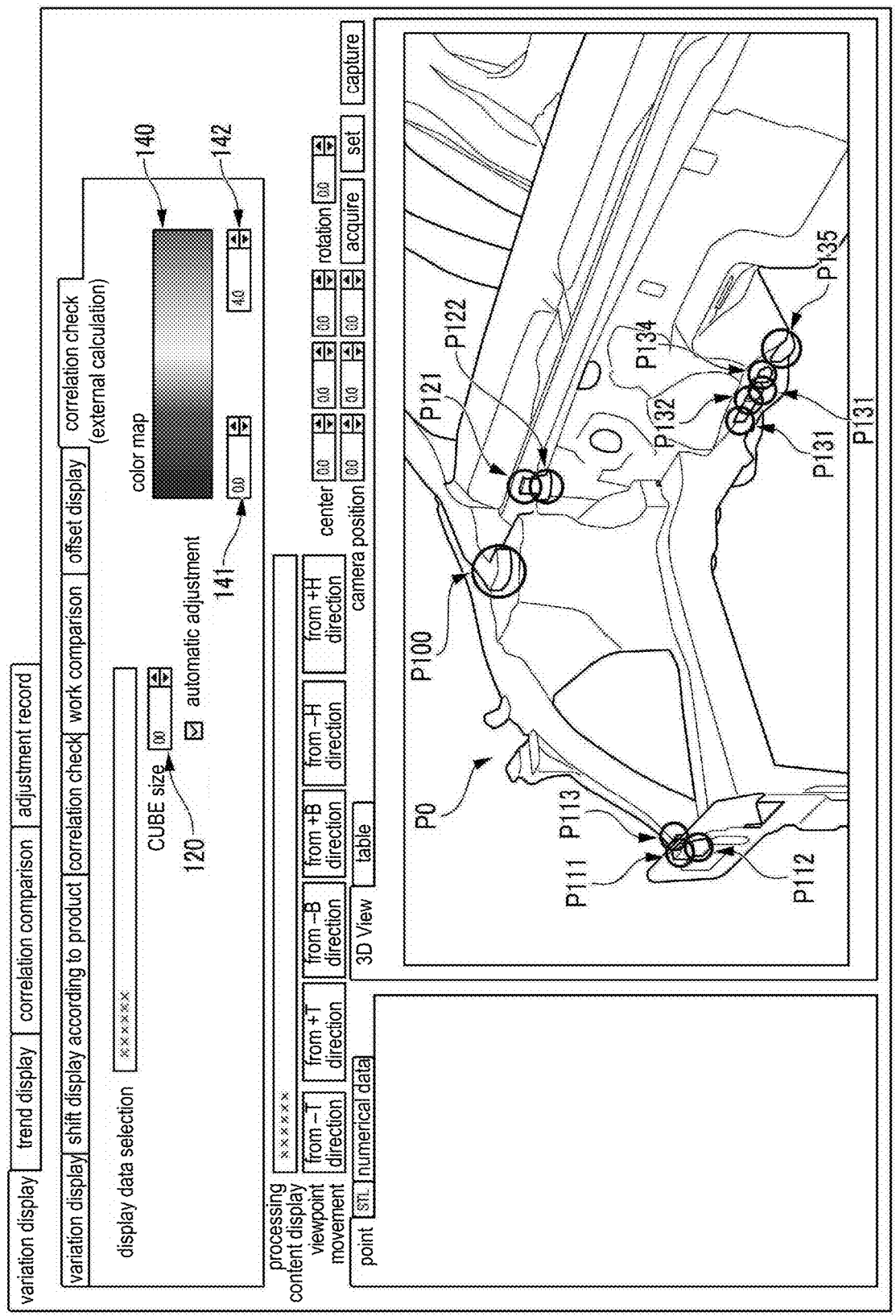
FIG. 2 is an illustrative diagram related to a first example of a product image and a contribution degree index image.
Figure 3:
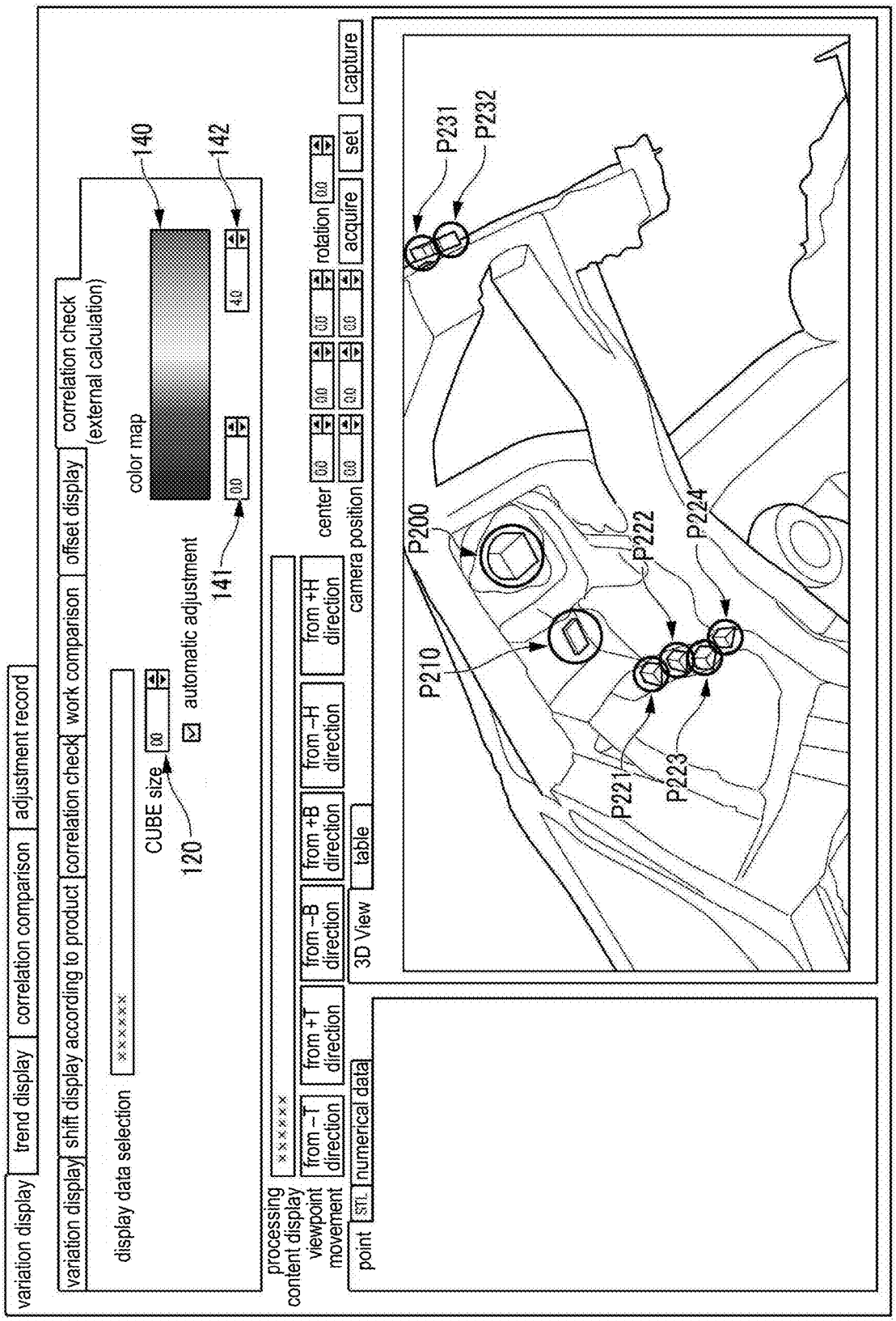
FIG. 3 is an illustrative diagram related to a second example of the product image and the contribution degree index image.

By the first image control element 21, for example, screens as shown in FIG. 2 and FIG. 3 are displayed on the display device constituting the output interface 12. In upper windows, a menu bar 120 for selecting the size of a substantially quadratic prism shaped icon used as the "contribution degree index image" described later, a color map 140 (hue scale) and menu bars 141 and 142 for selecting contribution degree corresponding to a hue equivalent to each of a lower limit and an upper limit of the color map 140 are shown.

In addition, in a lower right window, the product image representing the three-dimensional shape of the upper body of the vehicle used as a product is displayed on the display device constituting the output interface 12. For example, in the lower right window in FIG. 2, the product image P0 representing the three-dimensional shape of a front right portion of the upper body of the vehicle when viewed obliquely from the front left and from above is displayed. In addition, in the lower right window in FIG. 3, the product image P0 representing the three-dimensional shape of the front right portion of the upper body of the vehicle when view from the downward is displayed.

When the evaluation point of the product is designated through the input interface 11, an "evaluation point designated image" representing the evaluation point is displayed, by the second image control element 22, on the display device constituting the output interface 12. In the example of FIG. 2, a white substantially quadratic prism shaped (or substantially rectangular parallelepiped or substantially cubic) icon P100 that protrudes upward from the surface of a front damper center hole of a right side front wheel house designated as an evaluation point is displayed as the evaluation point designated image. In the example of FIG. 3, a white substantially quadratic prism shaped icon P200 that protrudes downward from the surface of the front damper center hole of the right side front wheel house designated as an evaluation point is displayed as the evaluation point designated image.

The icons P100 and P200 used as the evaluation point designated images may not have a substantially quadratic prism shape but have various three-dimensional shapes such as a substantially cylindrical shape, a substantially conical shape, a substantially frusto-conical shape, a substantially hemispherical shape or the like, and may not be white but have various colors such as red, blue, green or the like. An arrow icon pointing to the evaluation point, a colored image in which the surface of the evaluation point is locally given a color different from the surroundings, or the like may also be used as the evaluation point designated image. Display of the evaluation point designated image may also be omitted.

By the second image control element 22, the contribution degree of each of the plurality of parts or one site or a plurality of sites of each part with respect to the position precision of the evaluation point corresponding to the reference shape of the upper body is recognized. For example, a position y of the evaluation point corresponding to the reference shape of the upper body is used as an objective variable, a position shift (vector or scalar) $x_1, x_2, \ldots x_i, \ldots x_N$ on the basis of the reference shape of the plurality of sites of the upper body is used as an illustrative variable, and the contribution degree $\beta_1, \beta_2, \ldots \beta_i, \ldots \beta_N$ is calculated for N sites according to a linear multiple regression analysis $y = \beta_0 + \beta_1 x_1 + \beta_2 x_2 + \ldots + \beta_i x_i + \ldots + \beta_N x_N$. The position shift $x_1, x_2, \ldots x_N$ on the basis of the reference shape in each of the N sites which is an illustrative variable is obtained from a difference of the product shape measurement data with respect to the reference shape data. In the example, the linear multiple regression analysis is used as example, but the disclosure is not limited hereto, for example, a single regression analysis or the like may be used to obtain the contribution degree.

By the second image control element 22, M sites (M<N) with a relatively high contribution degree, that is, M sites with a higher contribution degree than any one of the remaining N–M sites are selected as "designated sites (of the designated part)".

Moreover, by the second image control element 22, the "contribution degree index image" representing the contribution degree is displayed on the display device constituting the output interface 12 in association with each of the M designated sites. In the example of FIG. 2, substantially quadratic prism shaped red icons P111-P113 that protrude from the surface of a ground surface between a front wheel house and a front side frame used as the designated sites of the designated part, substantially quadratic prism shaped blue icons P121 and P122 that protrude from the surface of a ground surface between the front wheel house and a first upper dashboard upper used as the designated sites of the designated part, and substantially quadratic prism shaped bluish purple icons P131-P135 that protrude from the surface of a ground surface between the front side frame and a lower dashboard used as the designated sites of the designated part are displayed as the contribution degree index images. In the example of FIG. 3, a substantially quadratic prism shaped icon P210 that protrudes from the surface of a ground surface between the front wheel house and a second upper dashboard used as the designated sites of the designated part, substantially quadratic prism shaped icons P221-P224 that protrude from the surface of the ground surface between the front wheel house and the lower dashboard used as the designated sites of the designated part, and substantially quadratic prism shaped icons P231-P232 that protrude from the surface of the ground surface between the front wheel house and the front side frame used as the designated sites of the designated part are displayed as the contribution degree index images.

The larger the protrusion amount of each icon having a substantially quadratic prism shape from each site, the higher the contribution degree. The color of the icon also represents the level of the contribution degree in a similar manner, for example, the longer the wavelength representing the hue (the larger the hue scale), the higher the contribution degree.

The icons used as the contribution degree index images may not have a substantially quadratic prism shape but have various three-dimensional shapes such as a substantially cylindrical shape, a substantially conical shape, a substantially frusto-conical shape, a substantially hemispherical shape or the like. An arrow icon pointing to each site, a colored image in which the surface of each site is locally given a color different from the surroundings, or the like may also be used as the contribution degree index image. In addition, a list showing the contribution degree of each site or the like may also be used as the contribution degree index image.

Figure 4:
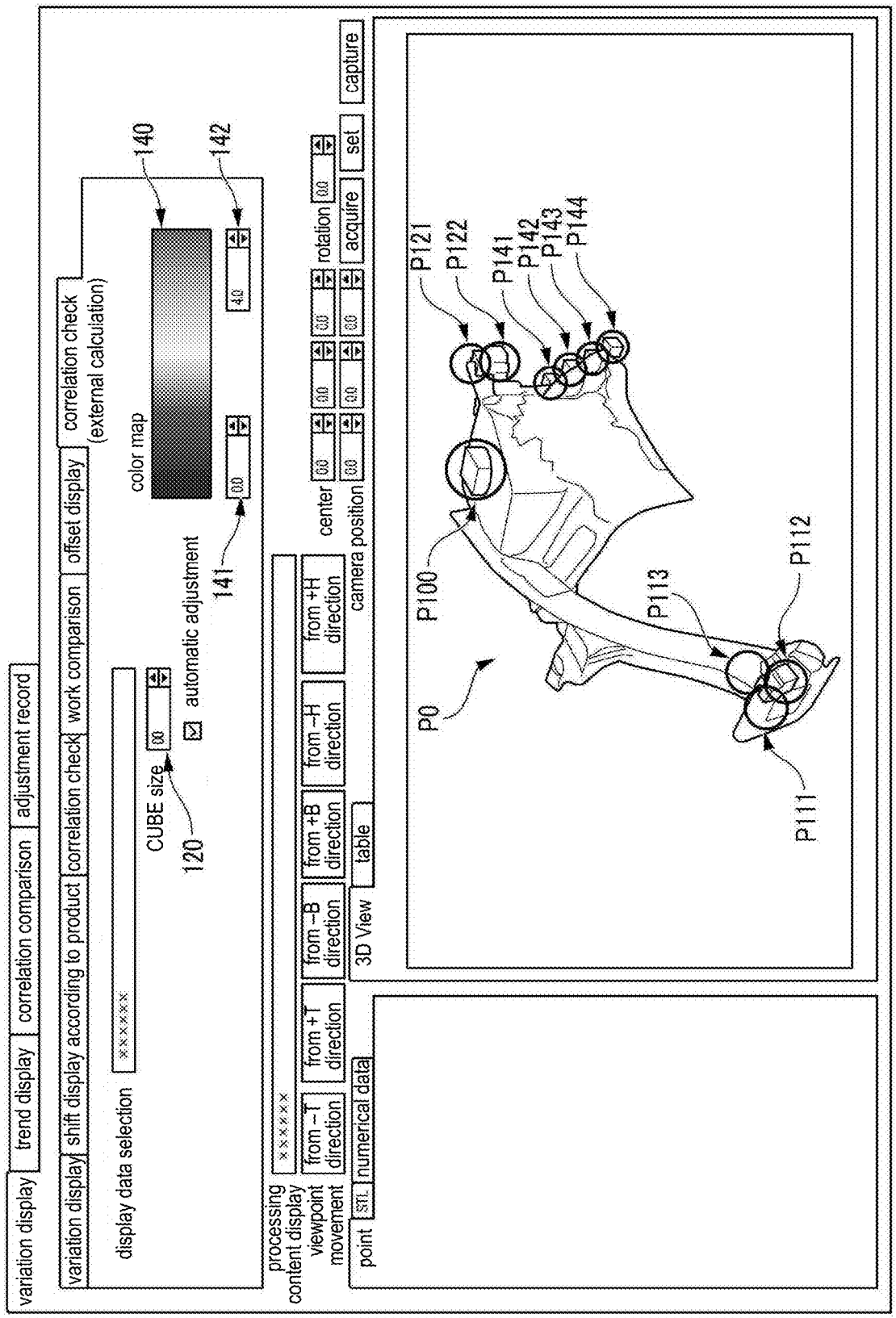
FIG. 4 is an illustrative diagram related to a third example of the product image and the contribution degree index image.

It may be that only some parts of the plurality of parts constituting the product are displayed on the output interface 12 as the product image P0. For example, corresponding to selection of the front wheel house on the screen of FIG. 2, only the front wheel house may be displayed as the product image P0 in a lower right side window as shown in FIG. 4. In this case, similar to the situation before the selection of the front wheel house of the part, the icon P100 used as the evaluation point designated image and the icons P111-113, P121-P122 used as the contribution degree index images associated with the designated sites of the designated part are output to and displayed on the output interface 12. In addition, the icons P141-144 that are used as the contribution degree index images associated with the designated sites of the designated part and that are not displayed before the selection of the front wheel house of the part are also displayed. The icons P141-144 are substantially quadratic prism shaped icons representing the level of the contribution degree of the ground surface between the front wheel house and the lower dashboard.

Figure 5:
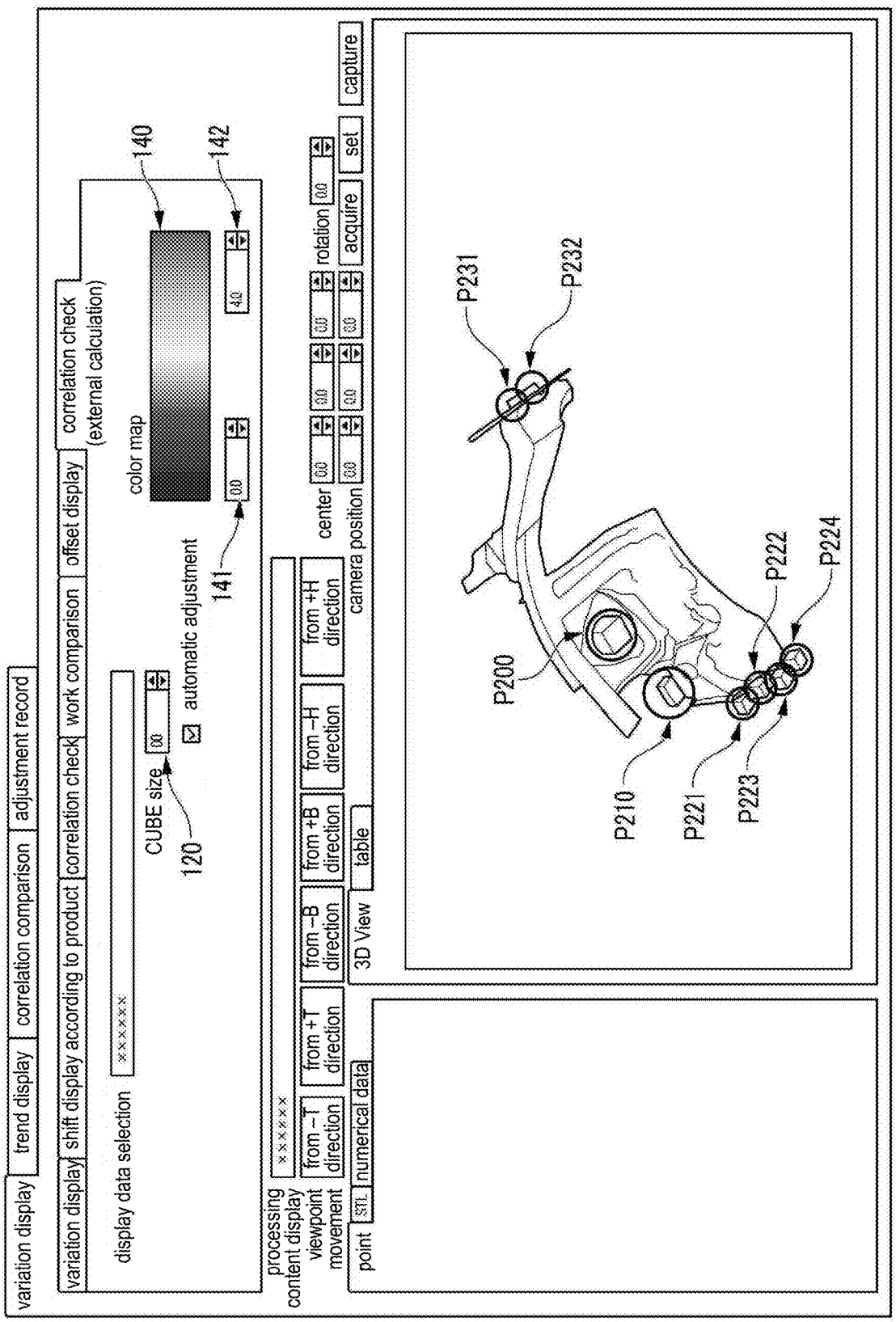
FIG. 5 is an illustrative diagram related to a fourth example of the product image and the contribution degree index image.

Corresponding to selection of the front wheel house on the screen of FIG. 3, only the front wheel house may be displayed as the product image P0 in a lower right side window as shown in FIG. 5. In this case, similar to the situation before the selection of the front wheel house of the part, the icon P200 used as the evaluation point designated image associated with the designated site of the designated part and the icons P210, P221-P224, P131-P132 used as the contribution degree index images are output to and displayed on the output interface 12.

(Effect)

According to the product evaluation result display system used as an embodiment of the disclosure, at least a part of the product image P0 representing the three-dimensional shape of the product configured by assembly of a plurality of parts is output to the output interface 12. When the evaluation point of the product is designated by the user through the input interface 12, in association with the designated part having a relatively high contribution degree with respect to the position precision of the evaluation point on the basis of the reference shape of the product, the contribution degree index image representing the contribution degree is output to the output interface 12. Therefore, within the plurality of parts constituting the product, the designated part having a relatively high contribution degree with respect to the position precision of the evaluation point designated by the user can be easily recognized by the user (see FIG. 2-FIG. 5).

Other Embodiments of the Disclosure

For each of a plurality of evaluation point candidates in the product, the contribution degree of each part or each site constituting the product may be calculated in advance by the second image control element 22 or a contribution degree evaluation element, and a combination between the plurality of evaluation point candidates and the contribution degree of each part (or each designated part) or each site (or each designated site) may be stored and kept in the storage device 24 constituting the image control device 20 or a database different from the product evaluation result display system. In this case, through the input interface 11, the contribution degree of each part (or each designated part) or each site (or each designated site) corresponding to one evaluation point candidate selected from the plurality of evaluation point candidates may be read out from the storage device 24 or the database by the second image control element 22, and then the contribution degree index image is generated and output to the output interface 12.

The contribution degree may be obtained in advance, for a plurality of identical products manufactured in the past, by statistical processing of data representing a combination of each of a plurality of evaluation points and a position shift of each part or each site on the basis of a reference shape of the product.

In addition, the contribution degree may also be obtained using a classifier such as a random forest or the like.

What is claimed is:

1. A product evaluation result display system, comprising:
    an input interface,
    an output interface, and
    an image control device, displaying, on the output interface, a product image representing a three-dimensional shape of a product that is configured by assembly of a plurality of parts; selecting, when an evaluation point of the product is designated through the input interface, a designated part within the plurality of parts which has a relatively high contribution degree with respect to a position precision of the evaluation point on a basis of a reference shape of the product; and displaying a contribution degree index image having a three-dimensional shape representing the contribution degree on the output interface in association with the designated part.

2. The product evaluation result display system according to claim 1,
    wherein the image control device selects a designated site having a relatively high contribution degree with respect to the position precision of the evaluation point on the basis of the reference shape in the designated part, and displays the contribution degree index image on the output interface in association with the designated site.

3. The product evaluation result display system according to claim 2,
    wherein the image control device displays the contribution degree index image on the output interface in different forms corresponding to a level of the contribution degree.

4. The product evaluation result display system according to claim 3,
    wherein the image control device displays the contribution degree index image on the output interface so as to display the contribution degree index image on a surface of the product image.

5. The product evaluation result display system according to claim 2,
    wherein the image control device displays the contribution degree index image on the output interface so as to display the contribution degree index image on a surface of the product image.

6. The product evaluation result display system according to claim 1,
    wherein the image control device displays the contribution degree index image on the output interface in different forms corresponding to a level of the contribution degree.

7. The product evaluation result display system according to claim 6,
    wherein the image control device displays the contribution degree index image on the output interface so as to display the contribution degree index image on a surface of the product image.

8. The product evaluation result display system according to claim 1,
    wherein the image control device displays the contribution degree index image on the output interface so as to display the contribution degree index image on a surface of the product image.

9. The product evaluation result display system according to claim 1,
    wherein the three-dimensional shape comprising a substantially cylindrical shape.

10. The product evaluation result display system according to claim 1,
    wherein the three-dimensional shape comprising a substantially conical shape.

11. The product evaluation result display system according to claim 1,
    wherein the three-dimensional shape comprising a substantially frusto-conical shape.

12. The product evaluation result display system according to claim 1,
    wherein the three-dimensional shape comprising substantially hemispherical shape.

* * * * *